(No Model.)
A. J. IDEN.
STEAM COOKING APPARATUS.
No. 493,091. Patented Mar. 7, 1893.
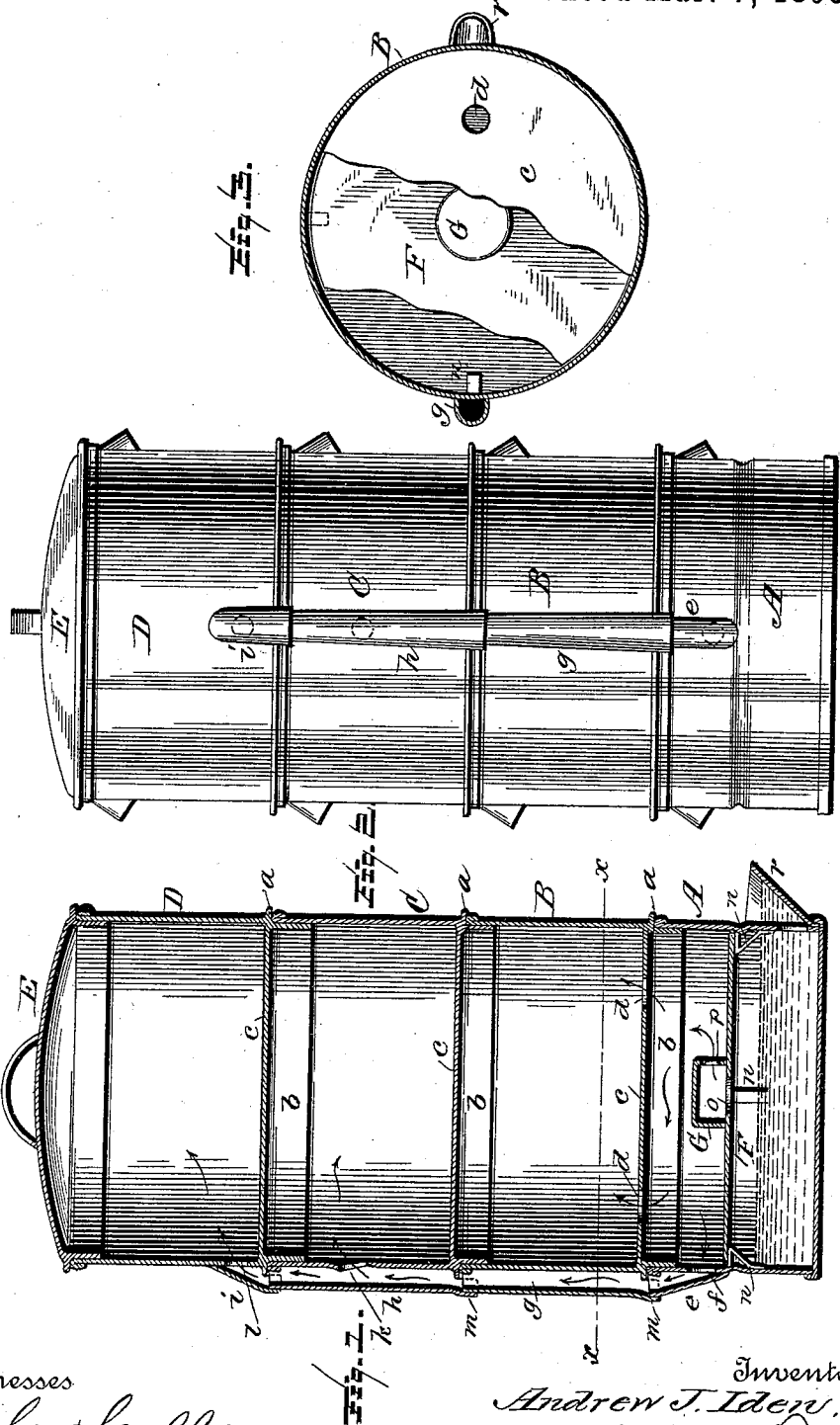

UNITED STATES PATENT OFFICE.

ANDREW J. IDEN, OF MILWAUKEE, WISCONSIN.

STEAM COOKING APPARATUS.

SPECIFICATION forming part of Letters Patent No. 493,091, dated March 7, 1893.

Application filed November 25, 1892. Serial No. 453,100. (No model.)

*To all whom it may concern:*

Be it known that I, ANDREW J. IDEN, a citizen of the United States, residing at Milwaukee, in the county of Milwaukee and State of Wisconsin, have invented certain new and useful Improvements in Steam Cooking Apparatus; and I do hereby declare that the following is a full, clear, and exact description of the same, reference being had to the annexed drawings, making a part of this specification, and to the letters of reference marked thereon.

The present invention has for its object to provide a simple and practical steam cooking apparatus in which the steam is partially condensed previous to its being supplied to a plurality of chambers or receptacles containing the food and thus obtaining a comparatively dry steam for the purpose of cooking without injury to the food by unnecessary moisture.

The invention therefore consists in a steam cooking apparatus constructed substantially as shown in the drawings and hereinafter described and claimed.

Figure 1 of the drawings represents a vertical central section of the apparatus; Fig. 2 a side elevation thereof; Fig. 3 a horizontal section taken on line $x$ $x$ of Fig. 1 showing the bottom of one of the receptacles and the condensing-plate partly broken away.

In the accompanying drawings A represents the lower receptacle for containing the water and generating the steam therefrom, and B C D represent the receptacles for containing the food which are detachably connected together.

The receptacles for containing the food have outwardly extending circumferential flanges $a$ which rest upon the edge of the receptacle below it, and a depending rim $b$ which fits therein, thus making a closed joint to prevent the escape of steam.

The receptacles B C D have bottoms $c$, the bottom of the receptacle B having holes $d$ through which the steam passes therein, and the upper one of the receptacles has a suitable cover E to close it and prevent the escape of the steam.

The receptacle A has upon its outer side a short tube $e$ which communicates with the interior thereof through the opening $f$ and when the several sections are connected together as shown in Fig. 1, the tube $e$ will communicate with the tube $g$ of the receptacle B and said tube will in turn communicate with a similar tube $h$ of the receptacle C, and the tube $h$ communicate with a tube $i$ of the receptacle D, thus forming a continuous tubular passage for the steam from the lower receptacle to the upper receptacle.

The steam from the receptacle A passes into the receptacle B through the openings $d$ in the bottom thereof, and the steam enters the receptacles C D through the openings $k$ $l$ respectively. The tubes $g$ $h$ at the lower ends are made flaring as shown at $m$ so as to closely fit over the ends of the tubes $e$ $g$ and prevent any escape of the steam as it passes from one section of tube to another in its upward course.

Upon the interior of the receptacle A are brackets $n$ for supporting a condensing-plate F which has a central condensing chamber G communicating with the interior of the receptacle through opening $o$ in the plate and with that portion of the receptacle above the condensing-plate through an opening $p$ in the chamber. The employment of the plate against which the steam is brought in contact as it is generated in connection with the chamber, removes the heavier part of the steam before it enters the receptacles in which the food is placed, thus enabling the cooking to be done with a very hot and dry steam and no mingling of water with the articles cooking.

The receptacle A is supplied with water through the spout $r$ and any number of receptacles for the food may be used as found desirable.

I reserve the right to make any changes or modifications in the details of construction as would come within ordinary mechanical skill, and this without departing from the principle of my invention.

Having now fully described my invention, what I claim as new, and desire to secure by Letters Patent, is—

In a steam cooking apparatus, a plurality of detachable food receptacles, each provided with a tubular section to form when together a passage for the steam, in combination with a water receptacle for the generation of steam, an independent condensing plate removably supported within the water receptacle, and a condensing chamber upon the upper side of the plate communicating with the water receptacle above and below the plate, substantially as and for the purpose set forth.

In testimony that I claim the above I have hereunto subscribed my name in the presence of two witnesses.

ANDREW J. IDEN.

Witnesses:
GARRETT DUNCK,
WALTER S. DROPPERS.